US012140091B2

(12) United States Patent
Katagi et al.

(10) Patent No.: US 12,140,091 B2
(45) Date of Patent: Nov. 12, 2024

(54) INTERNAL COMBUSTION ENGINE

(71) Applicant: HONDA MOTOR CO., LTD., Tokyo (JP)

(72) Inventors: Kenta Katagi, Tokyo (JP); Satoshi Kawawa, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/509,764

(22) Filed: Nov. 15, 2023

(65) Prior Publication Data

US 2024/0167430 A1 May 23, 2024

(30) Foreign Application Priority Data

Nov. 17, 2022 (JP) ................................ 2022-183844

(51) Int. Cl.
*F02D 13/02* (2006.01)
*F01L 1/053* (2006.01)
*F01L 1/344* (2006.01)

(52) U.S. Cl.
CPC ........ *F02D 13/0215* (2013.01); *F01L 1/0532* (2013.01); *F01L 2001/34433* (2013.01)

(58) Field of Classification Search
CPC .................. F01L 1/0532; F01L 1/3442; F01L 2001/34453; F02D 13/0215
See application file for complete search history.

(56) References Cited

U.S. PATENT DOCUMENTS 6,202,610 B1 3/2001 Yoshiki et al.
2018/0298815 A1* 10/2018 Moon .................... F02B 77/04

FOREIGN PATENT DOCUMENTS

CN 111156063 A * 5/2020 ............. F01L 1/022
CN 116792175 A * 9/2023
EP 3366895 A1 * 8/2018 ............. F01L 1/022
JP 2000227013 A 8/2000
JP 2015161278 A 9/2015

OTHER PUBLICATIONS

Notice of Reasons for Refusal for Japanese Patent Application No. 2022-183844 dated Feb. 20, 2024; 4 pp.

* cited by examiner

*Primary Examiner* — Ngoc T Nguyen
(74) *Attorney, Agent, or Firm* — Armstrong Teasdale LLP

(57) ABSTRACT

An internal combustion engine includes a variable valve timing mechanism. The variable valve timing mechanism includes a first member configured to rotate according to rotation of a crankshaft, a second member configured to be displaced relative to the first member between a most retarded angle position and a most advanced angle position, and a lock pin configured to engage with the first member and the second member. When displacing the second member from an initial angle, the variable valve timing mechanism supplies oil pressure such that the lock pin moves to a position where the lock pin disengages from the first member and the second member. A valve rest mechanism is capable of performing a rest operation when a displacement angle of the second member relative to the first member is equal to or more than a prescribed waiting angle displaced relative to the initial angle.

7 Claims, 11 Drawing Sheets

INTERNAL COMBUSTION ENGINE

TECHNICAL FIELD

The present invention relates to an internal combustion engine.

BACKGROUND ART

In recent years, research and development have been conducted on an internal combustion engine that contributes to energy efficiency to ensure that more people have access to affordable, reliable, sustainable, and advanced energy. For example, JP2000-227013A discloses an internal combustion engine including a variable valve timing mechanism configured to change an opening/closing timing of an intake valve. The variable valve timing mechanism includes a housing connected to a crankshaft via a timing chain and configured to rotate together with the crankshaft, and a rotor rotatably accommodated in the housing and coupled to an end of a camshaft. An advanced angle chamber and a retarded angle chamber are formed between the housing and the rotor. Oil pressure is supplied to the advanced angle chamber or the retarded angle chamber, thereby rotating the rotor relative to the housing and changing the phase of the camshaft relative to the crankshaft.

The rotor is provided with a lock pin that is movable between a locking position and a releasing position. The housing is provided with a lock hole into which the lock pin can be inserted. When the rotor is at an initial angle relative to the housing, the lock pin directly faces and enters the lock hole. As the lock pin enters the lock hole, the rotor is fixed at the initial angle relative to the housing. When the rotor rotates from the initial angle, the oil pressure is supplied to the lock hole, thereby pushing the lock pin back into the rotor and releasing the lock pin from the lock hole. At this time, if the release of the lock pin from the lock hole is delayed due to the decrease in the oil pressure and the like, the lock pin is caught between an edge of the rotor and an edge of the lock hole, which prevents the lock pin from moving. To solve this problem, the internal combustion engine according to JP2000-227013A starts supplying the oil pressure for releasing the lock pin from the lock hole when a crank angle is a prescribed angle. Thus, the lock pin is released when the difference between the torque applied to the rotor and the torque applied to the housing is small, and the lock pin is reliably released.

There is an internal combustion engine including a valve rest mechanism configured to perform a rest operation that rests opening drive of the intake valve. When the rest operation is performed, a reaction force an intake camshaft and an exhaust camshaft receive from the intake valve and an exhaust valve is reduced according to the action of the valve rest mechanism. Accordingly, the cam torque applied to the rotor from the camshafts is reduced, and the load biasing the rotor to the initial angle is reduced. Accordingly, the rotor is not stabilized at the initial angle, and the load applied to the lock pin increases. That is, when the rest operation is being performed, it becomes difficult for the lock pin to move to the releasing position. Accordingly, there is a problem that the lock pin is not released stably, and rotation of the rotor is inhibited.

SUMMARY OF THE INVENTION

In view of the above background, an object of the present invention is to smoothly operate a variable valve timing mechanism in an internal combustion engine including a valve rest mechanism. Further, another object of the present invention is to contribute to energy efficiency.

To achieve such an object, one aspect of the present invention provides an internal combustion engine (1), comprising: an oil pump (13) configured to receive a driving force of a crankshaft (10) and thereby generate oil pressure; a valve rest mechanism (35) driven by the oil pressure and configured to perform a rest operation that rests opening drive of at least an intake valve (21); and at least one variable valve timing mechanism (34) driven by the oil pressure and configured to change an opening/closing timing of at least one of the intake valve and an exhaust valve (22), wherein the variable valve timing mechanism includes: a first member (36) configured to rotate according to rotation of the crankshaft; a second member (37) provided between the first member and at least one of the intake valve and the exhaust valve and configured to be displaced relative to the first member between a most retarded angle position and a most advanced angle position; and a lock pin (38) configured to engage with the first member and the second member and thereby restrict rotation of the second member relative to the first member when the second member is in the most retarded angle position or the most advanced angle position set as an initial angle, when displacing the second member from the initial angle, the variable valve timing mechanism supplies the oil pressure such that the lock pin moves to a position where the lock pin disengages from the first member and the second member, and the valve rest mechanism is capable of performing the rest operation when a displacement angle of the second member relative to the first member is equal to or more than a prescribed waiting angle displaced relative to the initial angle.

According to this aspect, when the displacement angle of the second member relative to the first member is equal to or more than the waiting angle, the valve rest mechanism is capable of performing the rest operation. Accordingly, when the second member is at the initial angle, the valve rest mechanism does not perform the rest operation. Accordingly, when the second member is at the initial angle and the lock pin moves to a releasing position, the valve rest mechanism is not performing the rest operation. Accordingly, the second member receives a reaction force due to opening/closing of the intake valve, and is easily maintained at the initial angle. This facilitates the movement of the lock pin to the releasing position. This allows the variable valve timing mechanism to operate smoothly in an internal combustion engine including a valve rest mechanism.

In the above aspect, preferably, the variable valve timing mechanism is configured to maintain the second member at the waiting angle when the oil pressure supplied from the oil pump is lower than a returnable pressure required to return the second member to the initial angle, and the returnable pressure is set higher than a restable pressure required for the valve rest mechanism to perform the rest operation.

According to this aspect, when it is difficult to maintain the second member at the initial angle, the second member is maintained at the waiting angle and the lock pin is maintained at the releasing position. This prevents the lock pin from engaging with the first member and the second member. Accordingly, even if the valve rest mechanism performs the rest operation, the variable valve timing mechanism can operate smoothly.

In the above aspect, preferably, the second member is maintained at the initial angle when the oil pressure supplied from the oil pump is lower than an operable pressure required for an operation of the variable valve timing mechanism, and the operable pressure is set lower than the restable pressure.

According to this aspect, when the oil pressure is lower than the operable pressure, the valve rest mechanism prohibits the rest operation. Accordingly, even if the lock pin moves to a position where the lock pin engages with the first member and the second member, the lock pin can smoothly move from that position to the releasing position.

In the above aspect, preferably, the first member is coupled to the crankshaft via a transmission member (67), and the second member is coupled to an intake camshaft (27) configured to drive the intake valve, and an advanced angle chamber (41) and a retarded angle chamber (42) configured to be supplied with the oil pressure and thereby expand and contract are formed between the first member and the second member.

According to this aspect, the variable valve timing mechanism can change the valve timing of the intake valve by changing the phase of the intake camshaft relative to the crankshaft.

In the above aspect, preferably, the valve rest mechanism is provided between the intake camshaft and the intake valve.

According to this aspect, if a plurality of intake valves are provided, it is possible to rest the opening drive for each intake valve.

In the above aspect, preferably, the first member is coupled to the crankshaft via a transmission member (67), the second member is coupled to an exhaust camshaft (32) configured to drive the exhaust valve (22), and an advanced angle chamber (41) and a retarded angle chamber (42) configured to be supplied with the oil pressure and thereby expand and contract are formed between the first member and the second member.

According to this aspect, the variable valve timing mechanism can change the valve timing of the exhaust valve by changing the phase of the exhaust camshaft relative to the crankshaft.

In the above aspect, preferably, the variable valve timing mechanism is configured to prohibit the displacement angle of the second member relative to the first member from becoming less than the waiting angle when the valve rest mechanism is performing the rest operation.

According to this aspect, even if the oil pressure decreases while the valve rest mechanism is performing the rest operation, the valve rest mechanism can continue the rest operation.

Thus, according to the above aspects, it is possible to smoothly operate a variable valve timing mechanism in an internal combustion engine including a valve rest mechanism.

BRIEF DESCRIPTION OF THE DRAWING(S)

DETAILED DESCRIPTION OF THE INVENTION

In the following, an embodiment of an internal combustion engine according to the present invention will be described with reference to the drawings. In the following description, an in-line engine provided with four cylinders will be described. In another embodiment, the internal combustion engine may be a V-type engine.

Figure 1:
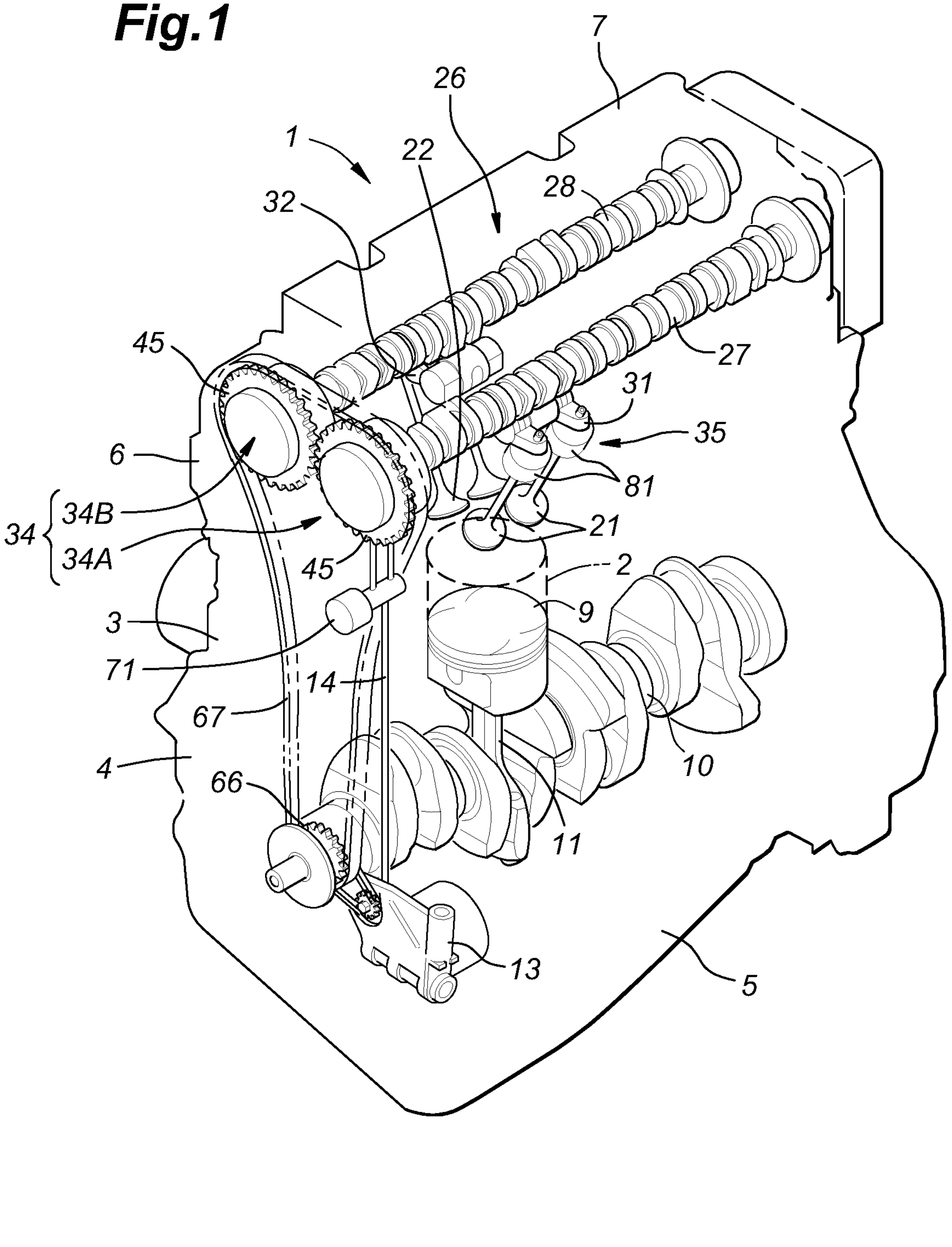
FIG. 1 is a transparent perspective view of an internal combustion engine according to an embodiment.

As shown in FIG. 1, an internal combustion engine 1 includes a cylinder block 3 provided with a plurality of cylinders 2, a crankcase 4 provided at a lower portion of the cylinder block 3, an oil pan 5 provided at a lower portion of the crankcase 4, a cylinder head 6 provided at an upper portion of the cylinder block 3, and a head cover 7 provided at an upper portion of the cylinder head 6. A piston 9 is received in each cylinder 2 such that the piston 9 can reciprocate. A crankshaft 10 is rotatably supported by the crankcase 4. The crankshaft 10 is connected to the piston 9 via a connecting rod 11. The crankshaft 10 rotates according to the reciprocation of the piston 9.

The internal combustion engine 1 includes an oil pump 13 configured to receive a driving force of the crankshaft 10 and thereby generate oil pressure. The oil pump 13 may be formed of a trochoid pump, for example. The oil pump 13 is connected to the crankshaft 10 via a chain and configured to rotate according to the rotation of the crankshaft 10. The oil pump 13 supplies oil to each portion of the internal combustion engine 1 via an oil passage 14 formed in the cylinder block 3.

Figure 5:
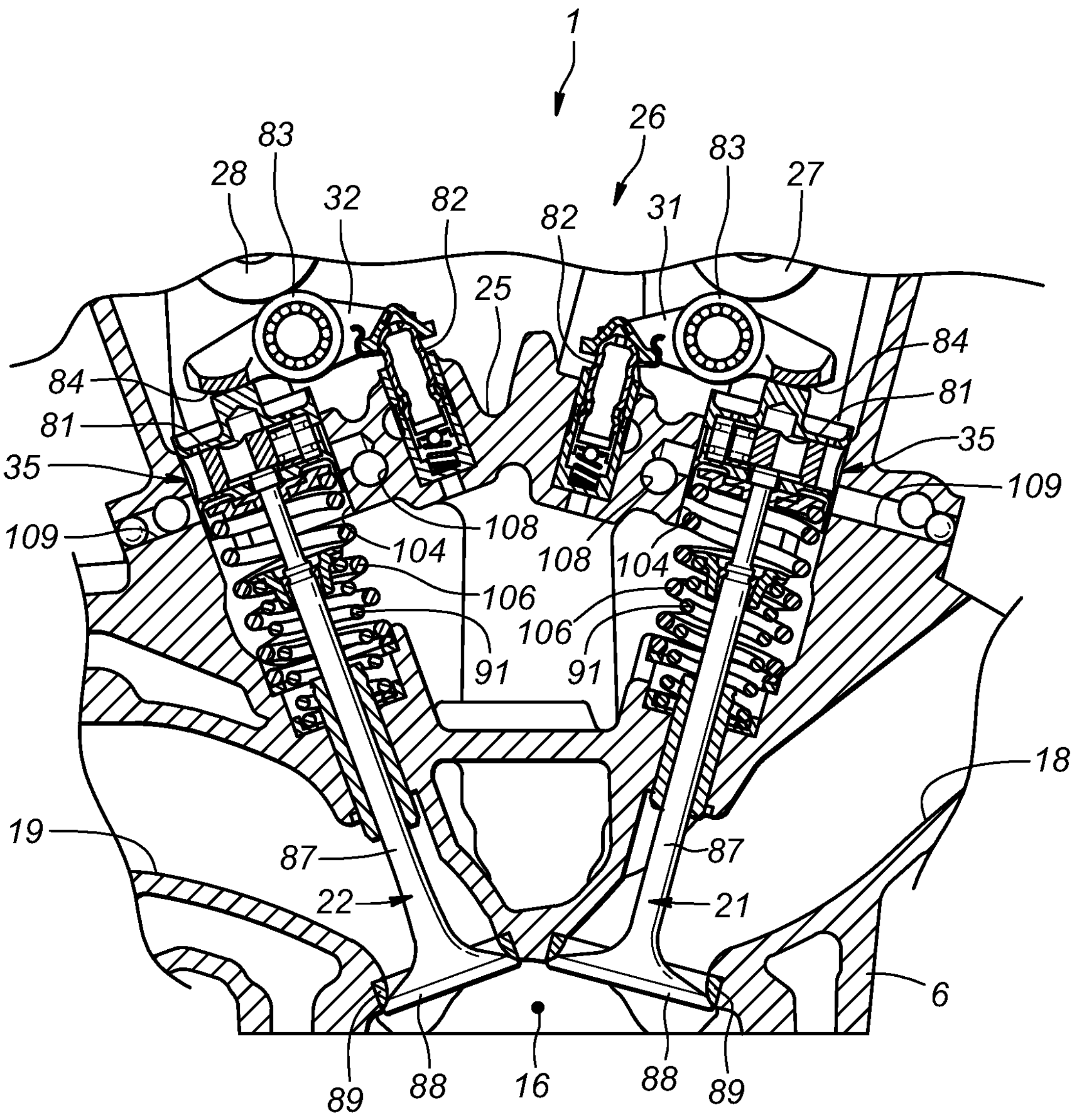
FIG. 5 is a cross-sectional view of a valve train including a valve rest mechanism.

As shown in FIG. 5, the cylinder head 6 includes combustion chambers 16 facing the respective cylinders 2. Two intake ports 18 and two exhaust ports 19 are connected to each combustion chamber 16. Each intake port 18 is provided with an intake valve 21. Each exhaust port 19 is provided with an exhaust valve 22.

As shown in FIGS. 1 and 5, a valve train chamber 25 is formed between the cylinder head 6 and the head cover 7. The valve train chamber 25 is provided with (accommodates) a valve train 26. The valve train 26 includes an intake camshaft 27, an exhaust camshaft 28, intake rocker arms 31, exhaust rocker arms 32, at least one variable valve timing mechanism 34 (Variable Timing Control: VTC), and at least one valve rest mechanism 35 (Variable Cylinder Management: VCM). The variable valve timing mechanism 34 is driven by the oil pressure and configured to change an opening/closing timing of at least one of the intake valve 21 and the exhaust valve 22. The valve rest mechanism 35 is driven by the oil pressure and configured to rest opening drive of at least the intake valve 21.

In the present embodiment, the variable valve timing mechanism 34 includes an intake variable valve timing mechanism 34A (hereinafter abbreviated as "intake VVT mechanism 34A") provided at one end of the intake camshaft 27, and an exhaust variable valve timing mechanism 34B (hereinafter abbreviated as "exhaust VVT mechanism 34B") provided at one end of the exhaust camshaft 28. The intake VVT mechanism 34A and the exhaust VVT mechanism 34B have substantially the same configuration.

Figure 2:
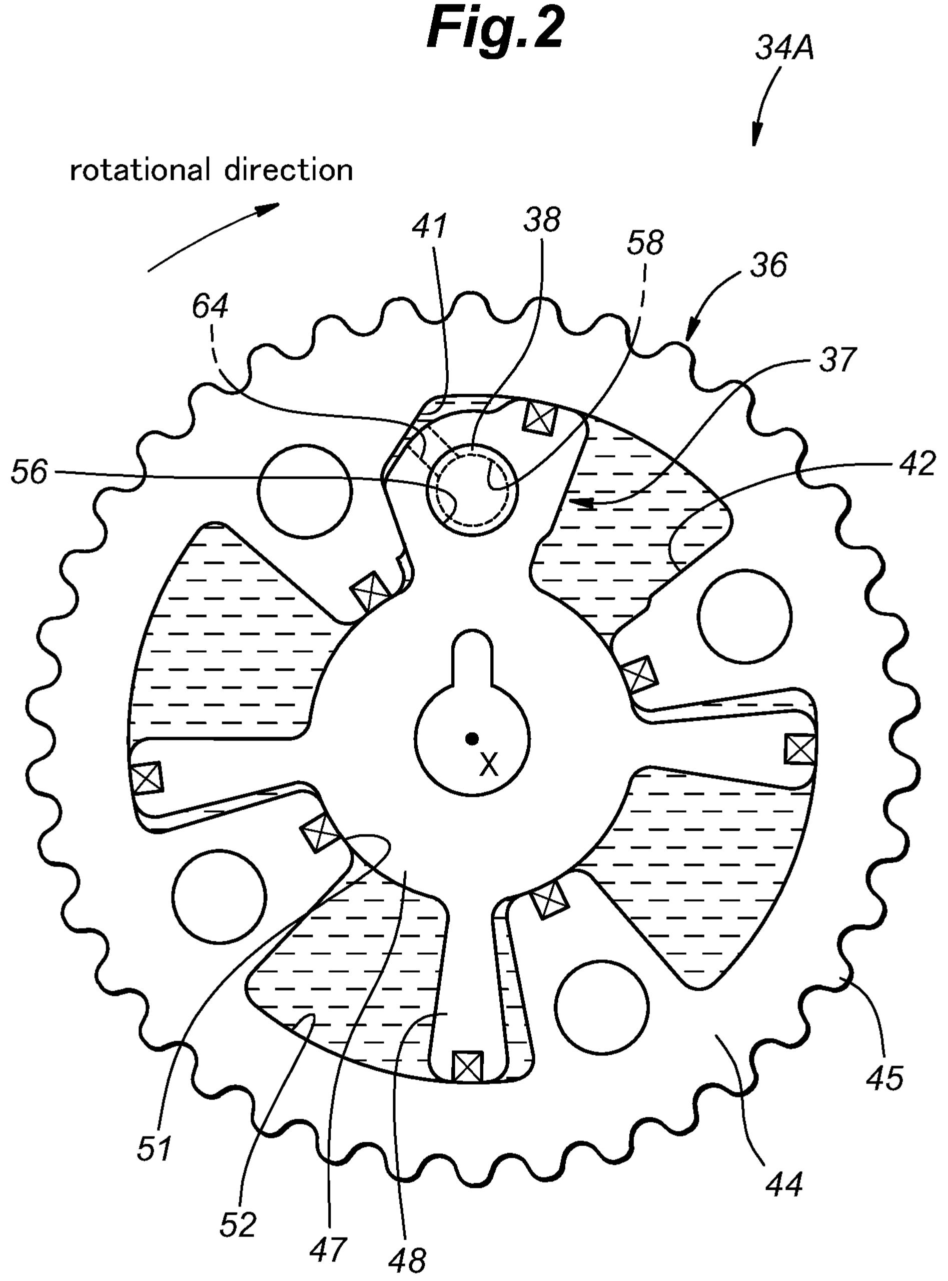
FIG. 2 is an explanatory diagram of an intake VVT mechanism.
Figure 3:
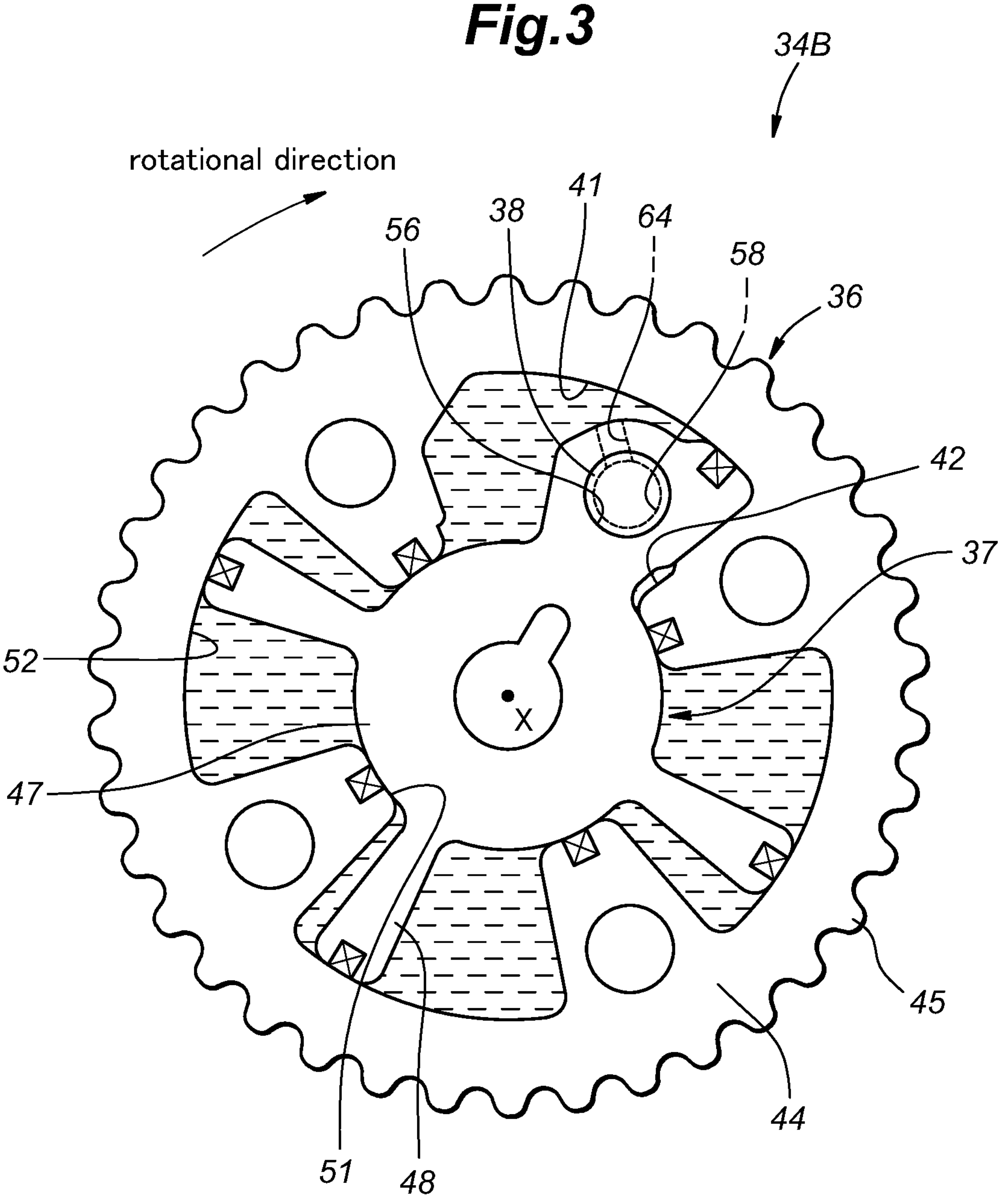
FIG. 3 is an explanatory diagram of an exhaust VVT mechanism.

As shown in FIGS. 2 and 3, the intake VVT mechanism 34A and the exhaust VVT mechanism 34B each include a first member 36 configured to rotate according to the rotation of the crankshaft 10, a second member 37 provided between the first member 36 and at least one of the intake valve 21 and the exhaust valve 22 and configured to be displaced relative to the first member 36 between a most retarded angle position and a most advanced angle position, and a lock pin 38 configured to engage with the first member 36 and the second member 37 and thereby restrict the rotation of the second member 37 relative to the first member 36 when the second member 37 is in the most retarded angle position or the most advanced angle position set as a first initial angle θD1 or a second initial angle θD2. An advanced angle chamber 41 and a retarded angle chamber 42 configured to be supplied with the oil pressure and thereby expand and contract are formed between the first member 36 and the second member 37.

The first member 36 includes a housing 44 having a cylindrical shape around an axial line X, and a sprocket 45 provided on an outer circumference of the housing 44. The second member 37 is a rotor provided inside the first member 36 such that the second member 37 is rotatable around the axial line X. The second member 37 includes a shaft 47 having a columnar shape around the axial line X, and a plurality of vanes 48 protruding from the shaft 47 in the radial direction. The housing 44 has a central hole 51 having a circular cross section and configured to rotatably receive the shaft 47, and a plurality of vane chambers 52 recessed radially outward from the central hole 51. Each vane chamber 52 has a prescribed angle in the circumferential direction around the axial line X. Each vane 48 is received in the corresponding vane chamber 52. Each vane 48 divides the corresponding vane chamber 52 into the advanced angle chamber 41 and the retarded angle chamber 42. As each vane 48 abuts against one of both circumferential ends of the corresponding vane chamber 52, the most advanced angle position and the most retarded angle position of the second member 37 relative to the first member 36 are determined. The second member 37 is rotatable relative to the first member 36 between the most advanced angle position and the most retarded angle position.

In the intake VVT mechanism 34A, the most retarded angle position is set as the first initial angle θD1 of the second member 37. In the exhaust VVT mechanism 34B, the most advanced angle position is set as the second initial angle θD2 of the second member 37. The second member 37 may be biased to the first initial angle θD1 or the second initial angle θD2 by a biasing member (not shown). The biasing member may be a compression coil spring, and may be provided between a wall of the vane chamber 52 and the vane 48.

Figure 4:
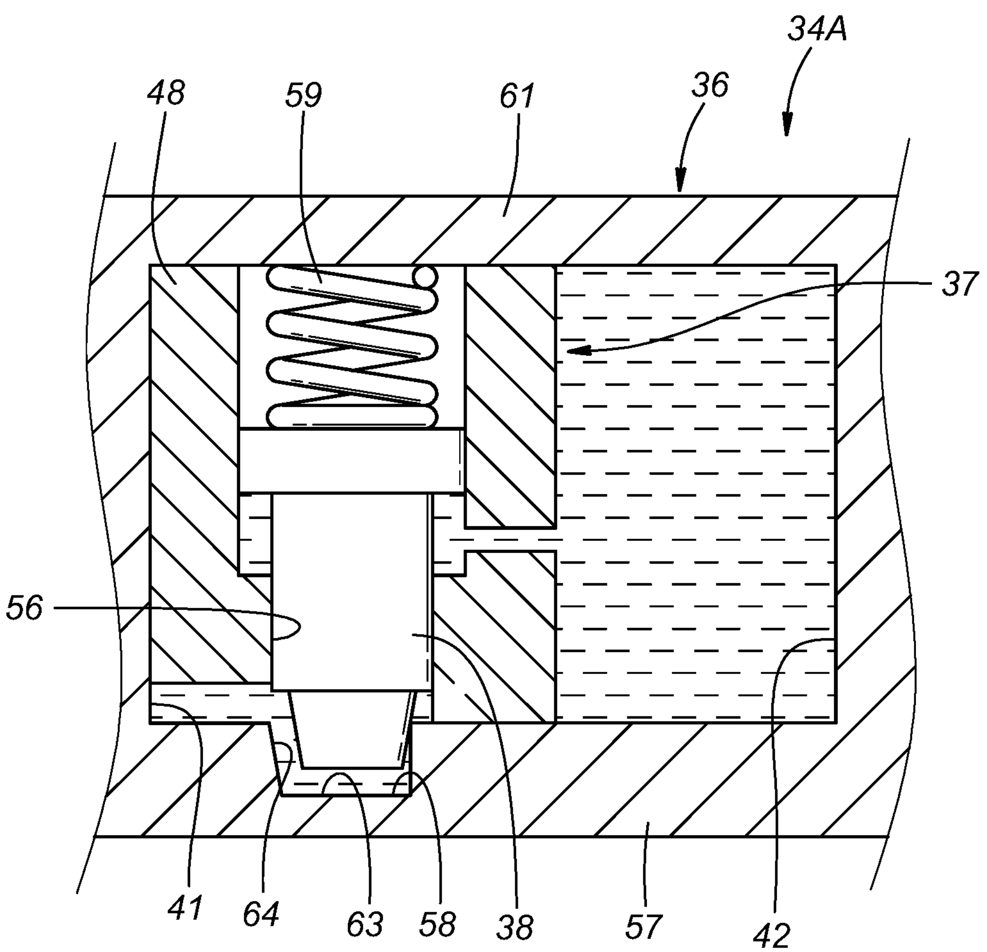
FIG. 4 is an explanatory diagram showing a lock pin of the intake VVT mechanism.

As shown in FIGS. 2 to 4, one of the plurality of vanes 48 is provided with a pin receiving hole 56 configured to slidably receive the lock pin 38. The pin receiving hole 56 extends parallel to the axial line X, and penetrates through the corresponding vane 48. A first end wall 57 (end wall on one side in the direction of the axial line X) of the housing 44 is provided with a lock hole 58 configured to receive a tip end of the lock pin 38. The lock hole 58 (and the pin receiving hole 56) is a recessed portion recessed in a direction parallel to the axial line X. When the second member 37 is at the first initial angle θD1 or the second initial angle θD2, the pin receiving hole 56 faces the lock hole 58. The lock pin 38 is biased toward the first end wall 57 by a biasing member 59. The biasing member 59 may be formed of a compression coil spring provided between a second end wall 61 (end wall on the other side in the direction of the axial line X) of the housing 44 and the lock pin 38. When the second member 37 is at the first initial angle θD1 or the second initial angle θD2, the lock pin 38 biased by the biasing member 59 enters the lock hole 58. Thus, the lock pin 38 engages with the first member 36 and the second member 37 in the circumferential direction of the axial line X, thereby restricting the rotation of the second member 37 relative to the first member 36. That is, when the lock pin 38 enters the lock hole 58, the second member 37 is maintained at the first initial angle θD1 or the second initial angle θD2. When the second member 37 is at a position deviated from the first initial angle θD1 or the second initial angle θD2, the pin receiving hole 56 and the lock hole 58 are not aligned (do not face each other), so that the lock pin 38 cannot enter the lock hole 58.

In a state where the lock pin 38 enters the lock hole 58, a gap 63 is formed between the bottom of the lock hole 58 and the lock pin 38. In the intake VVT mechanism 34A, the gap 63 is connected to the advanced angle chamber 41 via a communication passage 64. In the exhaust VVT mechanism 34B, the gap 63 is connected to the retarded angle chamber 42 via a communication passage 64.

As shown in FIG. 1, the shaft 47 of the second member 37 of the intake VVT mechanism 34A is coupled to one end of the intake camshaft 27. The one end of the intake camshaft 27 penetrates through the housing 44 of the intake VVT mechanism 34A. The axial line X of the intake VVT mechanism 34A is arranged coaxially with an axial line of the intake camshaft 27.

The shaft 47 of the second member 37 of the exhaust VVT mechanism 34B is coupled to one end of the exhaust camshaft 28. The one end of the exhaust camshaft 28 penetrates through the housing 44 of the exhaust VVT mechanism 34B. The axial line X of the exhaust VVT mechanism 34B is arranged coaxially with an axial line of the exhaust camshaft 28.

The first member 36 of each of the intake VVT mechanism 34A and the exhaust VVT mechanism 34B is connected to the crankshaft 10 via a transmission member. More specifically, a crank sprocket 66 is provided at one end of the crankshaft 10. A timing chain 67 (an example of the transmission member) is wound around the crank sprocket 66, the sprocket 45 of the intake VVT mechanism 34A, and the sprocket 45 of the exhaust VVT mechanism 34B. The intake camshaft 27 is connected to the crankshaft 10 via the timing chain 67 and the intake VVT mechanism 34A, thereby rotating at half the rotational speed of the crankshaft 10. The exhaust camshaft 28 is connected to the crankshaft 10 via the timing chain 67 and the exhaust VVT mechanism 34B, thereby rotating at half the rotational speed of the crankshaft 10.

Each of the intake VVT mechanism 34A and the exhaust VVT mechanism 34B includes a first oil pressure controller 71 configured to control oil (oil pressure) supplied to the advanced angle chamber 41 and the retarded angle chamber 42. The first oil pressure controller 71 may be formed of a known electromagnetic spool valve. The housing 44 of each of the intake VVT mechanism 34A and the exhaust VVT mechanism 34B is provided with an advanced angle oil passage (not shown) and a retarded angle oil passage (not shown). The advanced angle oil passage connects the advanced angle chamber 41 and the corresponding first oil pressure controller 71. The retarded angle oil passage connects the retarded angle chamber 42 and the corresponding first oil pressure controller 71. Each first oil pressure controller 71 is connected to the oil pump 13 and configured to supply oil (oil pressure) to the advanced angle chamber 41 and the retarded angle chamber 42.

As shown in FIG. 2, when the intake VVT mechanism 34A (more specifically, the second member 37 of the intake VVT mechanism 34A) is at the first initial angle θD1, the second member 37 and the intake camshaft 27 are at the most retarded angle position. At this time, the lock pin 38 enters (fits into) the lock hole 58, and the second member 37 is maintained at the first initial angle θD1. When the first oil pressure controller 71 supplies the oil pressure to the advanced angle chamber 41 and reduces the oil pressure of the retarded angle chamber 42, oil is supplied to the lock hole 58 via the advanced angle chamber 41 and the communication passage 64, and thus the lock pin 38 moves toward the pin receiving hole 56. Accordingly, the lock pin 38 is released (separated) from the lock hole 58, and the second member 37 can move to an advanced angle side relative to the first member 36. When the oil pressure is further supplied to the advanced angle chamber 41 in this state, the advanced angle chamber 41 expands and the retarded angle chamber 42 contracts according to the supply amount of the oil pressure. Accordingly, the second member 37 rotates from the most retarded angle position to the most advanced angle position. The rotational position of the second member 37 is determined by the amount of oil supplied to the advanced angle chamber 41.

As shown in FIG. 3, when the exhaust VVT mechanism 34B (more specifically, the second member 37 of the exhaust VVT mechanism 34B) is at the second initial angle θD2, the second member 37 and the exhaust camshaft 28 are at the most advanced angle position. At this time, the lock pin 38 enters (fits into) the lock hole 58, and the second member 37 is maintained at the second initial angle θD2. When the first oil pressure controller 71 supplies the oil pressure to the retarded angle chamber 42 and reduces the oil pressure of the advanced angle chamber 41, the oil pressure is supplied to the lock hole 58 via the retarded angle chamber 42 and the communication passage 64, and the lock pin 38 moves toward the pin receiving hole 56. Accordingly, the lock pin 38 is released (separated) from the lock hole 58, and the second member 37 can move to the retarded angle side relative to the first member 36. When the oil pressure is further supplied to the retarded angle chamber 42 in this state, the retarded angle chamber 42 expands and the advanced angle chamber 41 contracts according to the supply amount of the oil pressure. Accordingly, the second member 37 rotates from the most advanced angle position to the most retarded angle position. The rotational position of the second member 37 is determined by the amount of oil supplied to the retarded angle chamber 42.

As shown in FIG. 1, the valve rest mechanism 35 is provided between the intake camshaft 27 and a plurality of intake valves 21 corresponding to at least one cylinder 2. In the present embodiment, the valve rest mechanism 35 is provided at two intake valves 21 and two exhaust valves 22 corresponding to at least one cylinder 2. In a case where a plurality of valve rest mechanisms 35 is provided, each valve rest mechanism 35 includes a plurality of valve lifters 81 provided at the two intake valves 21 and the two exhaust valves 22 corresponding to the cylinder 2 as a target. The plurality of valve lifters 81 are provided between each intake valve 21 and the corresponding intake rocker arm 31 and between each exhaust valve 22 and the corresponding exhaust rocker arm 32. The structures of the exhaust rocker arm 32, the valve lifter 81, and the exhaust valve 22 are the same as those of the intake rocker arm 31, the valve lifter 81, and the intake valve 21.

As shown in FIG. 5, one end of the intake rocker arm 31 is supported to be swingable by the cylinder head 6 via a lash adjuster 82. A cam follower 83 that is in slide contact with the intake camshaft 27 is rotatably supported at the longitudinal center of the intake rocker arm 31. A sliding contact portion 84 that is in slide contact with the valve lifter 81 is provided at the other end of the intake rocker arm 31.

The intake valve 21 and the exhaust valve 22 each include a stem 87 and a valve head 88 provided at a tip end of the stem 87 and arranged in the combustion chamber 16. The valve head 88 is configured to close the intake port 18 by abutting against a valve seat 89 provided at a boundary between the combustion chamber 16 and the intake port 18. The intake valve 21 moves along an axial line of the stem 87 from a closed position to an open position that is displaced from the closed position toward the combustion chamber 16. When the intake valve 21 is in the open position, the valve head 88 is separated from the valve seat 89 and thus the intake port 18 is opened.

Each of the intake valve 21 and the exhaust valve 22 is biased to the closed position by a first spring 91 formed of a compression coil spring. One end of the first spring 91 is coupled to a longitudinal intermediate portion of the stem 87. The other end of the first spring 91 abuts against the cylinder head 6. The first spring 91 is arranged around the stem 87.

Figure 6:
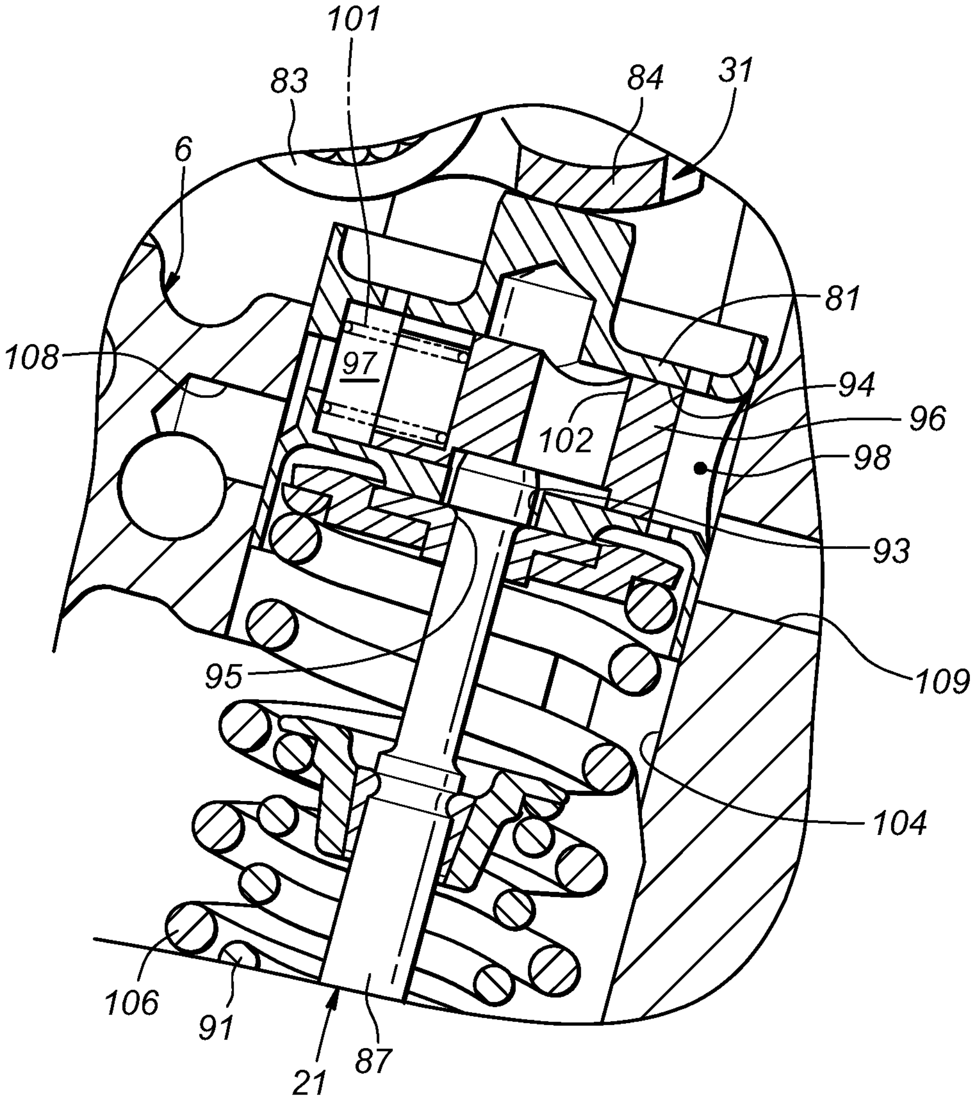
FIG. 6 is an enlarged cross-sectional view of the valve rest mechanism.

As shown in FIGS. 5 and 6, the valve lifter 81 is slidably supported by a base end of the stem 87. The valve lifter 81 has a stem receiving hole 93 configured to receive the base end of the stem 87 such that the base end of the stem 87 can slide in the axial line direction, and a switch pin receiving hole 94 extending in a direction perpendicular to the stem receiving hole 93. The valve lifter 81 includes a stem locking portion 95 configured to lock the base end of the stem 87 and thereby inhibit the base end of the stem 87 from separating from the stem receiving hole 93.

A switch pin 96 is slidably provided in the switch pin receiving hole 94. The valve lifter 81 is provided with a plurality of stoppers configured to abut against the switch pin 96, and the switch pin 96 is configured to be displaced between an operating position and a rest position. The switch pin 96 divides the switch pin receiving hole 94 into a first oil chamber 97 and a second oil chamber 98. When the switch pin 96 is in the operating position, the first oil chamber 97 is larger than the second oil chamber 98. When the switch pin 96 is in the rest position, the second oil chamber 98 is larger than the first oil chamber 97.

The switch pin 96 is biased to the operating position by a biasing member 101 formed of a compression coil spring, for example. The switch pin 96 has an insertion hole 102 penetrating therethrough in the same direction as the stem receiving hole 93. When the switch pin 96 is in the rest position, the insertion hole 102 and the stem receiving hole 93 are aligned (face each other), and thus the base end of the stem 87 can enter the insertion hole 102. When the switch pin 96 is displaced from the rest position, the insertion hole 102 is displaced from the stem receiving hole 93, and thus the base end of the stem 87 cannot enter the insertion hole 102. At this time, the base end of the stem 87 abuts against an outer surface of the switch pin 96.

The valve lifter 81 is slidably supported by a support hole 104 formed in the cylinder head 6. The support hole 104 extends in the same direction as the stem 87. The valve lifter 81 reciprocates inside the support hole 104 in the same direction as the stem 87. A second spring 106 configured to bias the valve lifter 81 toward the intake rocker arm 31 is provided between the valve lifter 81 and the cylinder head 6. The second spring 106 is formed of a compression coil spring. One end of the second spring 106 abuts against the valve lifter 81, and the other end of the second spring 106 abuts against the cylinder head 6. The second spring 106 is arranged around the stem 87. The inner diameter of the second spring 106 is larger than the outer diameter of the first spring 91.

A first oil passage 108 and a second oil passage 109 that open on the support hole 104 are formed in the cylinder head 6. When the valve lifter 81 is in a prescribed position inside the support hole 104, the first oil passage 108 is connected to the first oil chamber 97, and the second oil passage 109 is connected to the second oil chamber 98. The first oil passage 108 and the second oil passage 109 are connected to a second oil pressure controller 111 connected to the oil pump 13. The second oil pressure controller 111 may be formed of a known electromagnetic spool valve.

In an initial state, the second oil pressure controller 111 discharges oil from the second oil chamber 98 via the second oil passage 109, and thus the switch pin 96 is arranged at the operating position by the biasing force of the biasing member 101. At this time, the second oil pressure controller 111 may supply oil to the first oil chamber 97 via the first oil passage 108. When the switch pin 96 is in the operating position, the base end of the stem 87 abuts against the outer surface of the switch pin 96. This state is called "off state" of the valve rest mechanism 35. In the off state of the valve rest mechanism 35, when the intake rocker arm 31 pushes the valve lifter 81 toward the stem 87, the switch pin 96 pushes the base end of the stem 87, and thus the intake valve 21 moves from the closed position to the open position.

As the second oil pressure controller 111 discharges oil from the first oil chamber 97 via the first oil passage 108 and supplies oil to the second oil chamber 98 via the second oil passage 109, the switch pin 96 is arranged in (displaced to) the rest position against the biasing force of the biasing member 101. When the switch pin 96 is in the rest position, the insertion hole 102 is aligned with the stem receiving hole 93 (faces the stem receiving hole 93), and the base end of the stem 87 faces the insertion hole 102. This state is called "on state" of the valve rest mechanism 35. In the on state of the valve rest mechanism 35, when the intake rocker arm 31 presses the valve lifter 81 toward the stem 87, the base end of the stem 87 enters the insertion hole 102, and the valve lifter 81 does not push the base end of the stem 87. Accordingly, the intake valve 21 is maintained at the closed position. This blocks intake air and stops combustion in the corresponding cylinder 2. At this time, the fuel injection by a fuel injection device and the ignition operation by a spark plug are also stopped. The valve rest mechanism 35 stops the opening operation of the exhaust valve 22 (rests the opening drive of the exhaust valve 22), similar to the intake valve 21.

Figure 7:
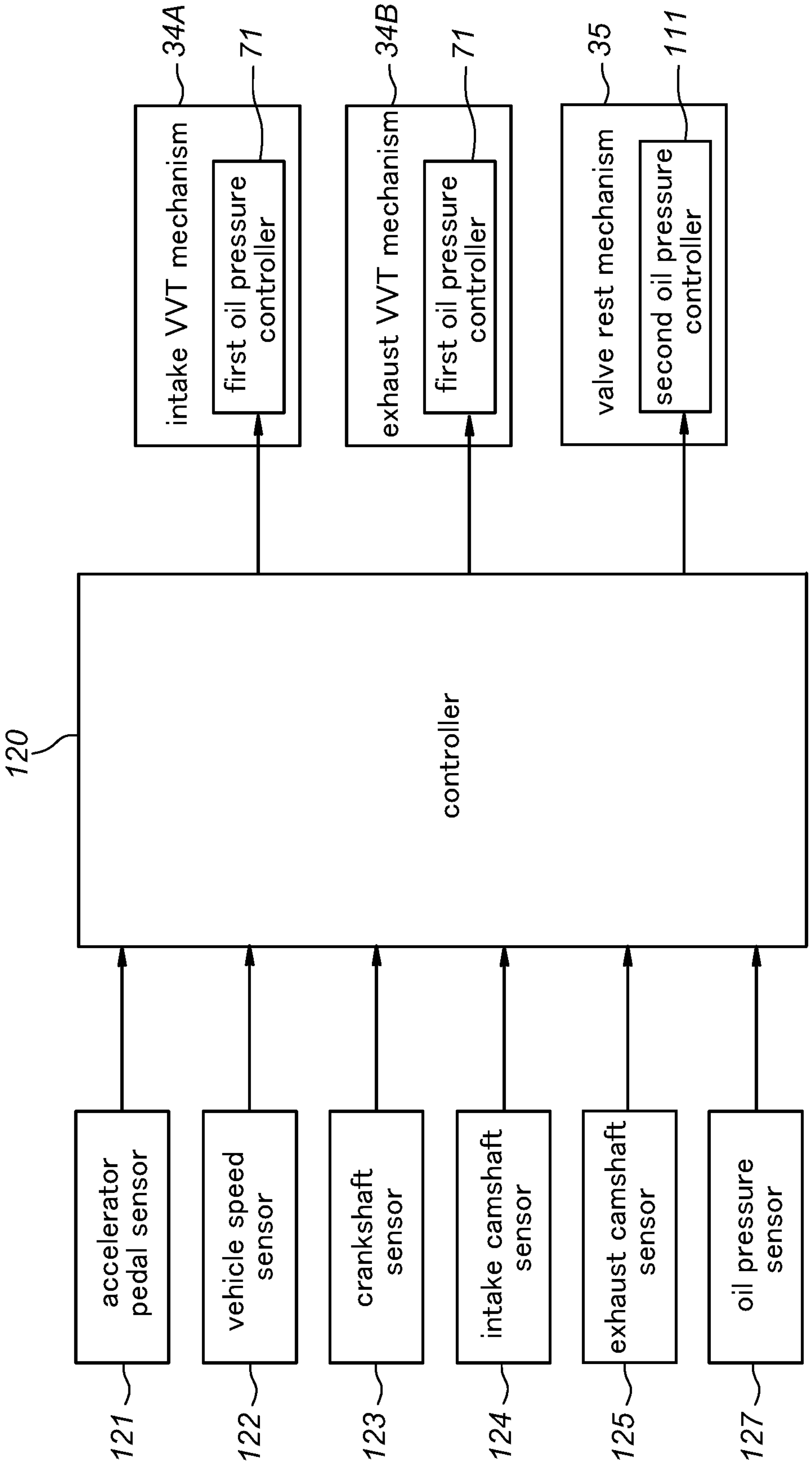
FIG. 7 is a block diagram showing a controller of the internal combustion engine.

As shown in FIG. 7, the intake VVT mechanism 34A, the exhaust VVT mechanism 34B, and the valve rest mechanism 35 are controlled by a controller 120. The controller 120 consists of an electronic control unit, and of an arithmetic operation device including a microprocessor (MPU), a non-volatile memory, a volatile memory, and an interface. The controller 120 realizes various applications as the microprocessor executes programs stored in the nonvolatile memory. The controller 120 may be formed of a single unit, or of a plurality of units working together.

The controller 120 controls the first oil pressure controller 71 of the intake VVT mechanism 34A, the first oil pressure controller 71 of the exhaust VVT mechanism 34B, and the second oil pressure controller 111 of the valve rest mechanism 35. The controller 120 is connected with an accelerator pedal sensor 121 configured to detect the position of an accelerator pedal, a vehicle speed sensor 122 configured to detect the vehicle speed of a vehicle in which the internal combustion engine 1 is installed, a crankshaft sensor 123 configured to detect the rotational phase of the crankshaft 10, an intake camshaft sensor 124 configured to detect the phase of the intake camshaft 27, an exhaust camshaft sensor 125 configured to detect the phase of the exhaust camshaft 28, and an oil pressure sensor 127 configured to detect the oil pressure supplied from the oil pump 13 as an engine oil pressure P. The oil pressure sensor 127 may be provided, for example, in the oil passage 14 connected to a discharge port of the oil pump 13.

The controller 120 acquires a rotational speed of the internal combustion engine 1 based on the signal from the crankshaft sensor 123. The controller 120 acquires an intake camshaft phase θ1 based on the signal from the crankshaft sensor 123 and the signal from the intake camshaft sensor 124. The intake camshaft phase θ1 is a displacement angle (phase difference) of the intake camshaft 27 relative to the crankshaft 10. The controller 120 acquires an exhaust camshaft phase θ2 based on the signal from the crankshaft sensor 123 and the signal from the exhaust camshaft sensor 125. The exhaust camshaft phase θ2 is a displacement angle (phase difference) of the exhaust camshaft 28 relative to the crankshaft 10. Regarding the intake camshaft phase θ1 and the exhaust camshaft phase θ2, the first initial angle θD1 or the second initial angle θD2 is defined as 0 degrees, an advanced angle is expressed as a positive value, and a retarded angle is expressed as a negative value.

The controller 120 may acquire a target load of the internal combustion engine 1 based on the accelerator opening degree acquired based on the signal from the accelerator pedal sensor 121, the vehicle speed acquired based on the signal from the vehicle speed sensor 122, and the rotational speed of the internal combustion engine 1. Thereafter, the controller 120 may set, based on the target load, an intake camshaft phase target value θT1 as a target value of the intake camshaft phase θ1 and an exhaust camshaft phase target value θT2 as a target value of the exhaust camshaft phase θ2. For example, the controller 120 may set the intake camshaft phase target value θT1 and the exhaust camshaft phase target value θT2 based on the target load by referring to a preset map. Further, the controller 120 may set the intake camshaft phase target value θT1 and the exhaust camshaft phase target value θT2 based on the target load and the rotational speed of the internal combustion engine 1.

The controller 120 controls, based on the intake camshaft phase θ1 and the intake camshaft phase target value θT1, the first oil pressure controller 71 of the intake VVT mechanism 34A so as to bring the intake camshaft phase θ1 closer to the intake camshaft phase target value θT1. For example, when the intake camshaft phase θ1 is smaller than the intake camshaft phase target value θT1, the controller 120 controls the first oil pressure controller 71 such that oil is supplied to the advanced angle chamber 41 and oil is discharged from the retarded angle chamber 42. Accordingly, the intake camshaft phase θ1 increases, and the intake camshaft phase θ1 gets closer to the intake camshaft phase target value θT1. Similarly, the controller 120 controls, based on the exhaust camshaft phase θ2 and the exhaust camshaft phase target value θT2, the first oil pressure controller 71 of the exhaust VVT mechanism 34B so as to bring the exhaust camshaft phase θ2 closer to the exhaust camshaft phase target value θT2.

The controller 120 may select the cylinder 2 to be rested based on the target load. For example, the controller 120 may determine the cylinder 2 to be rested based on the target load by referring to a preset map.

Figure 8:
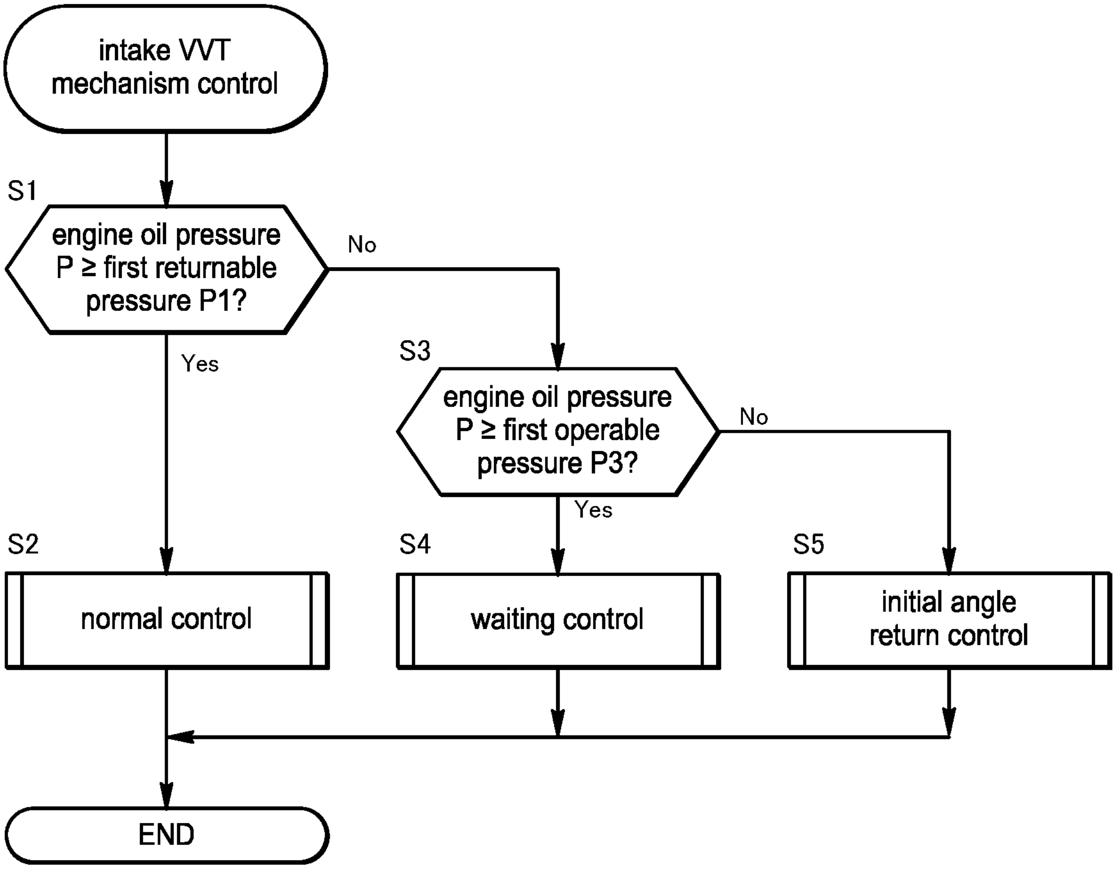
FIG. 8 is a flowchart showing the procedure of intake VVT mechanism control performed by the controller.

The controller 120 performs intake variable valve timing mechanism control (intake VVT mechanism control) shown in FIG. 8 at prescribed time intervals to control the intake VVT mechanism 34A. The controller 120 first determines whether the engine oil pressure P is equal to or higher than a first returnable pressure P1 (S1).

The first returnable pressure P1 is a pressure required to return the second member 37 of the intake VVT mechanism 34A to the first initial angle θD1 (most retarded angle position). The first returnable pressure P1 may be set based on experiment or simulation. The first returnable pressure P1 changes depending on the rotational speed of the internal combustion engine 1 (hereinafter referred to as "engine rotational speed") and the change rate thereof. Accordingly, the pressure that can return the second member 37 to the first initial angle θD1 (most retarded angle position) even if the engine rotational speed and the change rate thereof change may be preferably set as the first returnable pressure P1. The first returnable pressure P1 may be preferably set higher than a restable pressure P2 as a pressure (oil pressure) required for the valve rest mechanism 35 to perform a rest operation. The restable pressure P2 is a pressure required to move the switch pin 96 to the rest position. The restable pressure P2 may be set based on experiment or simulation.

In a case where the engine oil pressure P is equal to or higher than the first returnable pressure P1 (determination result of S1 is Yes), the controller 120 performs normal control of the intake VVT mechanism 34A (S2). In the normal control of the intake VVT mechanism 34A, the controller 120 may set the intake camshaft phase target value θT1 based on the target load of the internal combustion engine 1, and control the first oil pressure controller 71 of the intake VVT mechanism 34A based on the intake camshaft phase target value θT1 and the intake camshaft phase θ1. In the normal control, the intake camshaft phase target value θT1 is set greater than a first waiting angle θW1, which will be described later.

In a case where the engine oil pressure P is lower than the first returnable pressure P1 (determination result of S1 is No), the controller 120 determines whether the engine oil pressure P is equal to or higher than a first operable pressure P3 (S3). The first operable pressure P3 is set to a pressure required for the operation of the intake VVT mechanism 34A. The first operable pressure P3 is set lower than the first returnable pressure P1. Further, the first operable pressure P3 may be preferably set lower than the restable pressure P2. The first operable pressure P3 may be set based on experiment or simulation.

In a case where the engine oil pressure P is equal to or higher than the first operable pressure P3 (determination result of S3 is Yes), the controller 120 performs waiting control of the intake VVT mechanism 34A (S4). In the waiting control of the intake VVT mechanism 34A, the controller 120 maintains the second member 37 at the first waiting angle θW1. The first waiting angle θW1 is set to an angle displaced relative to the first initial angle θD1 by a prescribed angle. For example, regarding the intake VVT mechanism 34A, the first waiting angle θW1 may be an angle that is advanced by 5 to 10 degrees relative to the most retarded angle position. The controller 120 may set the first waiting angle θW1 as the intake camshaft phase target value θT1, and control the first oil pressure controller 71 of the intake VVT mechanism 34A based on the intake camshaft phase target value θT1 and the intake camshaft phase θ1.

In a case where the engine oil pressure P is lower than the first operable pressure P3 (determination result of S3 is No), the controller 120 performs initial angle return control of the intake VVT mechanism 34A (S5). In the initial angle return control of the intake VVT mechanism 34A, the controller 120 maintains the second member 37 at the first initial angle θD1. The controller 120 may set the first initial angle θD1 as the intake camshaft phase target value θT1, and control the first oil pressure controller 71 of the intake VVT mechanism 34A based on the intake camshaft phase target value θT1 and the intake camshaft phase θ1. Accordingly, the second member 37 is arranged at the first initial angle θD1, and the lock pin 38 engages with (enters) the lock hole 58.

When the controller 120 performs the initial angle return control of the intake VVT mechanism 34A, the engine oil pressure P is lower than the first operable pressure P3. Accordingly, the engine oil pressure P is lower than the restable pressure P2. In this case, the controller 120 prohibits the rest operation of the valve rest mechanism 35, which will be described later.

Figure 9:
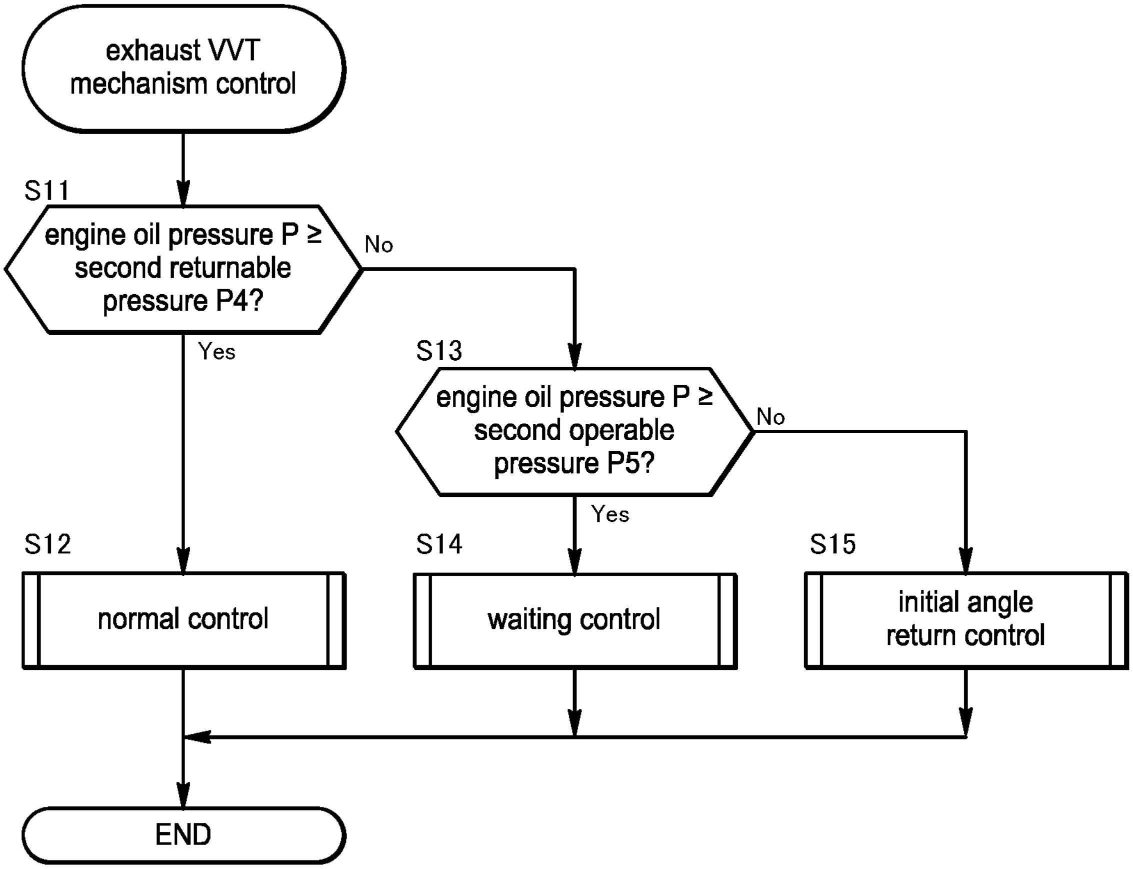
FIG. 9 is a flowchart showing the procedure of exhaust VVT mechanism control performed by the controller.

The controller 120 performs exhaust variable valve timing mechanism control (exhaust VVT mechanism control) shown in FIG. 9 at prescribed time intervals to control the exhaust VVT mechanism 34B. The controller 120 first determines whether the engine oil pressure P is equal to or higher than a second returnable pressure P4 (S11). The second returnable pressure P4 may be the same as the first returnable pressure P1, or may be different therefrom.

The second returnable pressure P4 is a pressure required to return the second member 37 of the exhaust VVT mechanism 34B to the second initial angle θD2 (most advanced angle position). The second returnable pressure P4 may be set based on experiment or simulation. The second returnable pressure P4 changes according to the engine rotational speed and the change rate thereof. Accordingly, a pressure that can return the second member 37 to the second initial angle θD2 (most advanced angle position) even if the engine rotational speed and the change rate thereof change may be preferably set as the second returnable pressure P4. The second returnable pressure P4 may be preferably set higher value than the restable pressure P2.

In a case where the engine oil pressure P is equal to or higher than the second returnable pressure P4 (determination result of S11 is Yes), the controller 120 performs normal control of the exhaust VVT mechanism 34B (S12). In the normal control of the exhaust VVT mechanism 34B, the controller 120 may set the exhaust camshaft phase target value θT2 based on the target load of the internal combustion engine 1, and control the first oil pressure controller 71 of the exhaust VVT mechanism 34B based on the exhaust camshaft phase target value θT2 and the exhaust camshaft phase θ2. In the normal control, the exhaust camshaft phase target value θT2 is set greater than a second waiting angle θW2, which will be described later.

In a case where the engine oil pressure P is lower than the second returnable pressure P4 (determination result of S11 is No), the controller 120 determines whether the engine oil pressure P is equal to or higher than a second operable pressure P5 (S13). The second operable pressure P5 is set to a pressure required for the operation of the exhaust VVT mechanism 34B. The second operable pressure P5 is set lower than the second returnable pressure P4. Further, the second operable pressure P5 may be preferably set lower than the restable pressure P2.

In a case where the engine oil pressure P is equal to or higher than the second operable pressure P5 (determination result of S13 is Yes), the controller 120 performs waiting control of the exhaust VVT mechanism 34B (S14). In the waiting control of the exhaust VVT mechanism 34B, the controller 120 maintains the second member 37 at a second waiting angle θW2. The second waiting angle θW2 is set to a position (angle) displaced relative to the second initial angle θD2 by a prescribed angle. For example, regarding the exhaust VVT mechanism 34B, the second waiting angle θW2 may be an angle that is retarded relative to the most advanced angle position by 5 to 10 degrees. The controller 120 may set the second waiting angle θW2 as the exhaust camshaft phase target value θT2, and control the first oil pressure controller 71 of the exhaust VVT mechanism 34B based on the exhaust camshaft phase target value θT2 and the exhaust camshaft phase θ2.

In a case where the engine oil pressure P is lower than the second operable pressure P5 (determination result of S13 is No), the controller 120 performs initial angle return control of the exhaust VVT mechanism 34B (S15). In the initial angle return control of the exhaust VVT mechanism 34B, the controller 120 maintains the second member 37 at the second initial angle θD2. The controller 120 may set the second initial angle θD2 as the exhaust camshaft phase target value θT2, and control the first oil pressure controller 71 of the exhaust VVT mechanism 34B based on the exhaust camshaft phase target value θT2 and the exhaust camshaft phase θ2. Accordingly, the second member 37 is arranged at the second initial angle θD2, and the lock pin 38 engages with (enters) the lock hole 58.

When the controller 120 performs the initial angle return control of the exhaust VVT mechanism 34B, the engine oil pressure P is lower than the second operable pressure P5. Accordingly, the engine oil pressure P is lower than the restable pressure P2. In this case, the controller 120 prohibits the rest operation of the valve rest mechanism 35, which will be described later.

Figure 10:
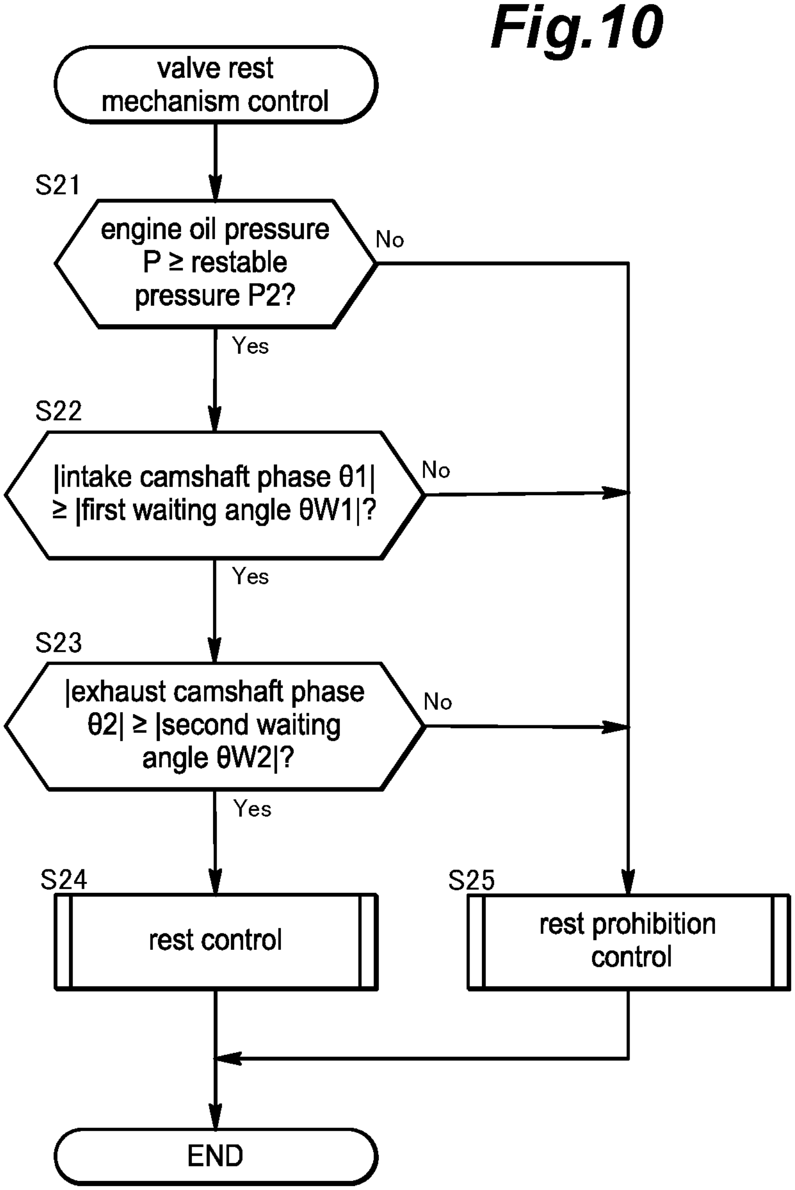
FIG. 10 is a flowchart showing the procedure of valve rest mechanism control performed by the controller.

The controller 120 performs valve rest mechanism control shown in FIG. 10 at prescribed time intervals to control the valve rest mechanism 35. The controller 120 first determines whether the engine oil pressure P is equal to or higher than the restable pressure P2 (S21).

In a case where the engine oil pressure P is equal to or higher than the restable pressure P2 (determination result of S21 is Yes), the controller 120 determines whether the absolute value of the intake camshaft phase θ1 is equal to or more than the absolute value of the first waiting angle θW1 (S22).

In a case where the absolute value of the intake camshaft phase θ1 is equal to or more than the absolute value of the first waiting angle θW1 (determination result of S22 is Yes), the controller 120 determines whether the absolute value of the exhaust camshaft phase θ2 is equal to or more than the absolute value of the second waiting angle θW2 (S23).

In a case where the absolute value of the exhaust camshaft phase θ2 is equal to or more than the absolute value of the second waiting angle θW2 (determination result of S23 is Yes), the controller 120 performs rest control (S24). In the rest control, the controller 120 determines the cylinder 2 to be rested based on the target load, and controls the second oil pressure controller 111 of the valve rest mechanism 35 corresponding to the cylinder 2 to be rested. Accordingly, the valve rest mechanism 35 corresponding to the cylinder 2 to be rested performs the rest operation, and thus the opening operation (opening drive) of the intake valve 21 and the exhaust valve 22 that correspond to the cylinder 2 to be rested is stopped (rested).

In a case where the engine oil pressure P is lower than the restable pressure P2 (determination result of S21 is No), in a case where the absolute value of the intake camshaft phase θ1 is less than the absolute value of the first waiting angle θW1 (determination result of S22 is No), or in a case where the absolute value of the exhaust camshaft phase θ2 is less than the absolute value of the second waiting angle θW2 (determination result of S23 is No), the controller 120 performs rest prohibition control to prohibit the rest operation of the valve rest mechanism 35 (S25). Accordingly, the rest operation of the valve rest mechanism 35 is prohibited, and thus all the cylinders 2 are in an operating state.

Figure 11:
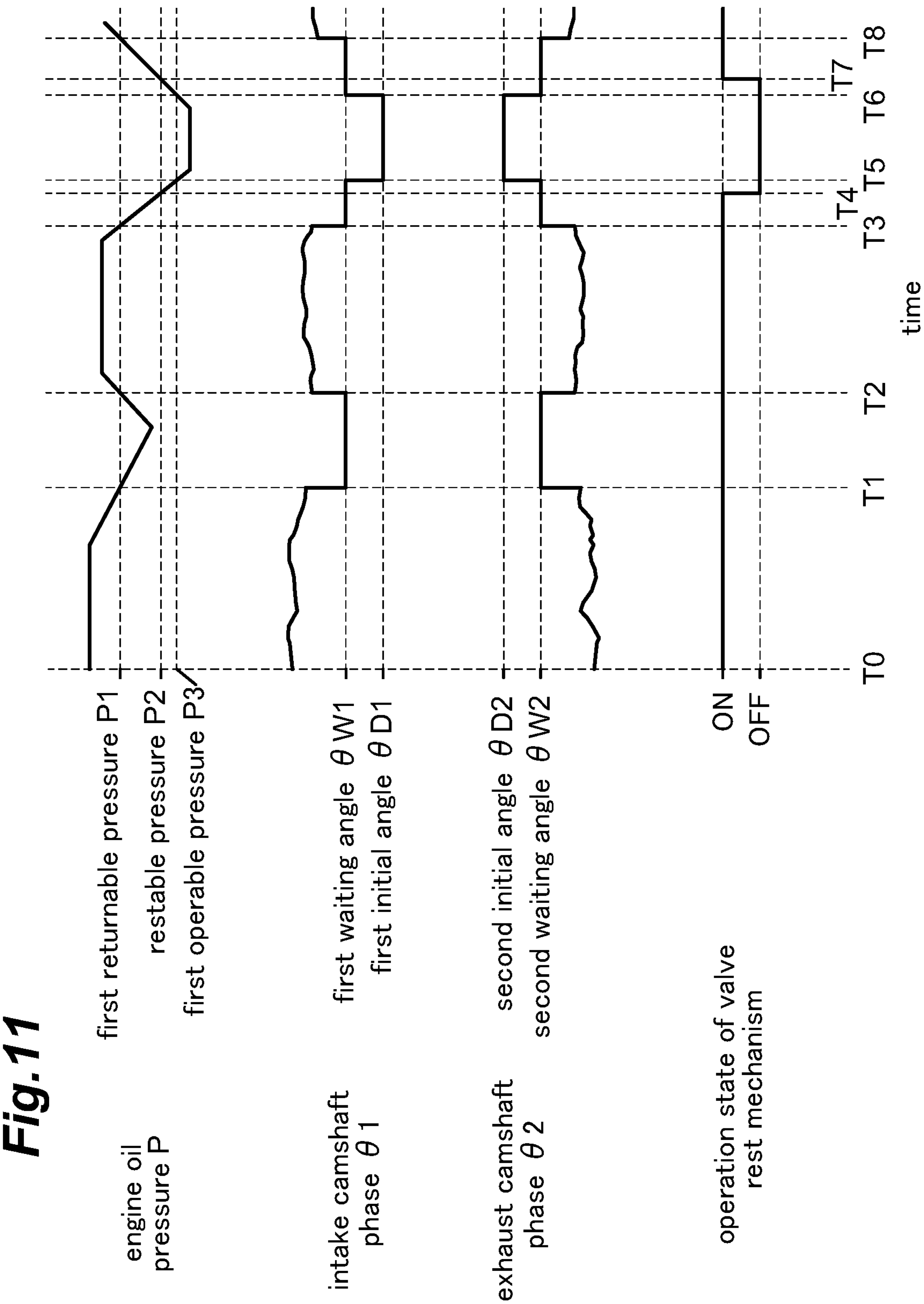
FIG. 11 is a timing chart showing a state of the intake VVT mechanism, the exhaust VVT mechanism, and the valve rest mechanism.

Operating states of the intake VVT mechanism 34A, the exhaust VVT mechanism 34B, and the valve rest mechanism 35 in a case where the controller 120 performs the above control are shown in the timing chart of FIG. 11. In this example, the first returnable pressure P1 and the second returnable pressure P4 are set to the same value, and the first operable pressure P3 and the second operable pressure P5 are set to the same value.

As shown in FIG. 11, at time T0, the engine oil pressure P is equal to or higher than the first returnable pressure P1. Accordingly, the intake VVT mechanism 34A, the exhaust VVT mechanism 34B, and the valve rest mechanism 35 are controlled normally and operate according to the target load.

At time T1, when the engine oil pressure P becomes lower than the first returnable pressure P1, the intake VVT mechanism 34A is maintained at the first waiting angle θW1, and the exhaust VVT mechanism 34B is maintained at the second waiting angle θW2. At this time, the valve rest mechanism 35 is controlled normally, and rests the cylinder 2 determined according to the target load. When the engine oil pressure P becomes equal to or higher than the first returnable pressure P1 at time T2, the intake VVT mechanism 34A, the exhaust VVT mechanism 34B, and the valve rest mechanism 35 are controlled normally, and operate according to the target load.

At time T3, when the engine oil pressure P becomes lower than the first returnable pressure P1, the intake VVT mechanism 34A is maintained at the first waiting angle θW1, and the exhaust VVT mechanism 34B is maintained at the second waiting angle θW2. At this time, the valve rest mechanism 35 is controlled normally, and rests the cylinder 2 determined according to the target load.

When the engine oil pressure P further decreases and becomes lower than the restable pressure P2 at time T4, the rest operation of the valve rest mechanism 35 is prohibited, and thus all the cylinders 2 are in the operating state.

When the engine oil pressure P further decreases and becomes lower than the first operable pressure P3 at time T5, the intake VVT mechanism 34A and the exhaust VVT mechanism 34B are maintained at the first initial angle θD1 and the second initial angle θD2, respectively by the initial angle return control.

When the engine oil pressure P increases and becomes equal to or higher than the first operable pressure P3 at time T6, the intake VVT mechanism 34A is maintained at the first waiting angle θW1, and the exhaust VVT mechanism 34B is maintained at the second waiting angle θW2.

When the engine oil pressure P further increases and becomes equal to or higher than the restable pressure P2 at time T7, the valve rest mechanism 35 is capable of performing the rest operation, and the cylinder 2 determined according to the target load turns into a rest state.

When the engine oil pressure P further increases and becomes equal to or higher than the first returnable pressure P1 at time T8, the intake VVT mechanism 34A, the exhaust VVT mechanism 34B, and the valve rest mechanism 35 are controlled normally.

As shown in FIG. 11, when the absolute value of the phase (more specifically, the intake camshaft phase θ1) of the intake VVT mechanism 34A becomes less than the absolute value of the first waiting angle θW1, the valve rest mechanism 35 is always in a state of not performing the rest operation. Similarly, when the absolute value of the phase (more specifically, the exhaust camshaft phase θ2) of the exhaust VVT mechanism 34B becomes less than the absolute value of the second waiting angle θW2, the valve rest mechanism 35 is always in the state of not performing the rest operation. Accordingly, when the intake VVT mechanism 34A and the exhaust VVT mechanism 34B are advanced or retarded relative to the first initial angle θD1 or the second initial angle θD2, the valve rest mechanism 35 is always in the state of not performing the rest operation. In a case where the valve rest mechanism 35 is not performing the rest operation, the amount of oil that can be supplied to the intake VVT mechanism 34A and the exhaust VVT mechanism 34B increases. Accordingly, the lock pin 38 can be reliably and smoothly released (removed) from the lock hole 58. Thus, it is possible to smoothly operate the intake VVT mechanism 34A and the exhaust VVT mechanism 34B in the internal combustion engine 1 including the valve rest mechanism 35.

If the lock pin 38 is released from the lock hole 58 while the valve rest mechanism 35 is performing the rest operation, the amount of oil supplied to the intake VVT mechanism 34A and the exhaust VVT mechanism 34B is reduced since oil is distributed to the valve rest mechanism 35. Further, in a state where the valve rest mechanism 35 is performing the rest operation, the reaction force from the intake valve 21 and the exhaust valve 22 corresponding to the rested cylinder 2 is reduced. Accordingly, the force that biases the intake VVT mechanism 34A and the exhaust VVT mechanism 34B to the initial angle is reduced. Accordingly, the release of the lock pin 38 from the lock hole 58 may become unstable. Furthermore, in this state, when the oil pressure is applied to the first member 36 to rotate the second member 37, the lock pin 38 may be caught between an edge of the pin receiving hole 56 and an edge of the lock hole 58, and thus the movement of the lock pin 38 may be inhibited.

When the engine oil pressure P is lower than the first returnable pressure P1, the intake VVT mechanism 34A maintains the second member 37 at the first waiting angle θW1. Further, when the engine oil pressure P is lower than the second returnable pressure P4, the exhaust VVT mechanism 34B maintains the second member 37 at the second waiting angle θW2. Accordingly, when it is difficult to maintain the second member 37 at the first initial angle θD1 or the second initial angle θD2, the second member 37 is maintained at the waiting angle, and the lock pin 38 is maintained at a released position. This prevents malfunction of the lock pin 38 and allows the variable valve timing mechanism 34 to operate smoothly.

When the engine oil pressure P is lower than the operable pressure, the valve rest mechanism 35 prohibits the rest operation. Accordingly, even if the second member 37 unintentionally moves to the initial angle and the lock pin 38 engages with the lock hole 58, the lock pin 38 can be smoothly removed from the lock hole 58.

Concrete embodiments of the present invention have been described in the foregoing, but the present invention should not be limited by the foregoing embodiments and various modifications and alterations are possible within the scope of the present invention. For example, one of the intake VVT mechanism 34A and the exhaust VVT mechanism 34B may be omitted. In this case, a sprocket 45 may be provided in place of the omitted variable valve timing mechanism 34. The sprocket 45 may be connected to one end of a camshaft, and the timing chain 67 may be wound around the sprocket 45. Further, the variable valve timing mechanism 34 and the valve rest mechanism 35 of the present embodiment are merely examples, and may be replaced with a known mechanism driven by the oil pressure.

The first oil pressure controller 71 of the intake VVT mechanism 34A, the first oil pressure controller 71 of the exhaust VVT mechanism 34B, and the second oil pressure controller 111 of the valve rest mechanism 35 may be formed integrally.

The invention claimed is:

1. An internal combustion engine, comprising:

an oil pump configured to receive a driving force of a crankshaft and thereby generate oil pressure;

a valve rest mechanism driven by the oil pressure and configured to perform a rest operation that rests opening drive of at least an intake valve; and at least one variable valve timing mechanism driven by the oil pressure and configured to change an opening/closing timing of at least one of the intake valve and an exhaust valve, wherein the variable valve timing mechanism includes:

a first member configured to rotate according to rotation of the crankshaft;

a second member provided between the first member and at least one of the intake valve and the exhaust valve and configured to be displaced relative to the first member between a most retarded angle position and a most advanced angle position; and a lock pin configured to engage with the first member and the second member and thereby restrict rotation of the second member relative to the first member when the second member is in the most retarded angle position or the most advanced angle position set as an initial angle, when displacing the second member from the initial angle, the variable valve timing mechanism supplies the oil pressure such that the lock pin moves to a position where the lock pin disengages from the first member and the second member, and the valve rest mechanism is capable of performing the rest operation when a displacement angle of the second member relative to the first member is equal to or more than a prescribed waiting angle displaced relative to the initial angle.

2. The internal combustion engine according to claim 1, wherein the variable valve timing mechanism is configured to maintain the second member at the waiting angle when the oil pressure supplied from the oil pump is lower than a returnable pressure required to return the second member to the initial angle, and the returnable pressure is set higher than a restable pressure required for the valve rest mechanism to perform the rest operation.

3. The internal combustion engine according to claim 2, wherein the second member is maintained at the initial angle when the oil pressure supplied from the oil pump is lower than an operable pressure required for an operation of the variable valve timing mechanism, and the operable pressure is set lower than the restable pressure.

4. The internal combustion engine according to claim 1, wherein the first member is coupled to the crankshaft via a transmission member, and the second member is coupled to an intake camshaft configured to drive the intake valve, and an advanced angle chamber and a retarded angle chamber configured to be supplied with the oil pressure and thereby expand and contract are formed between the first member and the second member.

5. The internal combustion engine according to claim 4, wherein the valve rest mechanism is provided between the intake camshaft and the intake valve.

6. The internal combustion engine according to claim 1, wherein the first member is coupled to the crankshaft via a transmission member, the second member is coupled to an exhaust camshaft configured to drive the exhaust valve, and an advanced angle chamber and a retarded angle chamber configured to be supplied with the oil pressure and thereby expand and contract are formed between the first member and the second member.

7. The internal combustion engine according to claim 1, wherein the variable valve timing mechanism is configured to prohibit the displacement angle of the second member relative to the first member from becoming less than the waiting angle when the valve rest mechanism is performing the rest operation.

* * * * *